United States Patent
Drazich

(10) Patent No.: US 7,558,663 B2
(45) Date of Patent: Jul. 7, 2009

(54) FUEL INJECTION CONTROL SYSTEM WITH EXEMPT AREA OF FUEL MAP

(76) Inventor: Tyler T Drazich, P.O. Box 1041, Three Forks, MT (US) 59752

( * ) Notice: Subject to any disclaimer, the term of this patent is extended or adjusted under 35 U.S.C. 154(b) by 90 days.

(21) Appl. No.: 11/866,574

(22) Filed: Oct. 3, 2007

(65) Prior Publication Data
US 2009/0093941 A1 Apr. 9, 2009

(51) Int. Cl.
*B60T 7/12* (2006.01)
*F02D 41/00* (2006.01)
(52) U.S. Cl. .................. 701/103; 701/104; 123/674
(58) Field of Classification Search ................ 701/103, 701/104, 114, 115, 123; 123/674, 675, 677
See application file for complete search history.

(56) References Cited

U.S. PATENT DOCUMENTS

| | | | |
|---|---|---|---|
| 6,354,268 B1* | 3/2002 | Beck et al. | 123/435 |
| 6,512,974 B2* | 1/2003 | Houston et al. | 701/115 |
| 7,404,397 B2* | 7/2008 | Dobeck | 123/672 |
| 2007/0129878 A1* | 6/2007 | Pepper | 701/123 |

* cited by examiner

*Primary Examiner*—John T Kwon
(74) *Attorney, Agent, or Firm*—Volpe and Koenig PC

(57) ABSTRACT

A fuel management system for fuel injected vehicles permits a user to modify vehicle performance without exceeding acceptable standards for vehicle emissions. A portion of the fuel management system fuel map is designated as an exempt area in which the user is not permitted to modify the fuel offset values.

21 Claims, 8 Drawing Sheets

FUEL MAP

| Engine RPM | Throttle Position (Percentage of full throttle) | | | | | | | | |
|---|---|---|---|---|---|---|---|---|---|
| | 0 | 2 | 5 | 10 | 20 | 40 | 60 | 80 | 100 |
| 500 | $P_{1,1}$ | P | P | P | P | P | P | P | P |
| 750 | P | P | P | P | P | P | P | P | P |
| 1000 | P | P | P | P | P | P | P | P | P |
| 1250 | P | P | P | P | P | P | P | P | P |
| 1500 | P | P | $P_{3,5}$ | P | P | P | P | P | P |
| 1750 | P | $P_{2,6}$ | $P_{3,6}$ | P | P | P | P | P | P |
| 2000 | P | P | P | P | P | P | P | P | P |
| 2250 | P | P | P | P | P | P | P | P | P |
| 2500 | P | P | P | P | P | P | P | P | P |
| 2750 | P | P | P | P | P | P | P | P | P |
| 3000 | P | P | P | P | P | P | P | P | P |
| 3250 | P | P | P | P | P | P | P | P | P |
| 3500 | P | P | P | P | P | P | P | P | P |
| 3750 | P | P | P | P | P | P | P | P | P |
| 4000 | P | P | P | P | P | P | P | P | P |
| 4250 | P | P | P | P | P | P | P | P | P |
| 4500 | P | P | P | P | P | P | P | P | P |
| 4750 | P | P | P | P | P | P | P | P | P |
| 5000 | $P_{1,19}$ | P | P | P | P | P | P | P | P |

P = Programmable area

FIGURE 3

(Prior Art)

FUEL MAP

Engine RPM     Throttle Position (percentage of full throttle)

| Engine RPM | 0 | 2 | 5 | 10 | 20 | 40 | 60 | 80 | 100 |
|---|---|---|---|---|---|---|---|---|---|
| 500 | $X_{j,k}$ | $X_{j,k}$ | $X_{j,k}$ | $X_{j,k}$ | $X_{j,k}$ | P | P | P | P |
| 750 | $X_{j,k}$ | $X_{j,k}$ | $X_{j,k}$ | $X_{j,k}$ | $X_{j,k}$ | P | P | P | P |
| 1000 | $X_{j,k}$ | $X_{j,k}$ | $X_{j,k}$ | $X_{j,k}$ | $X_{j,k}$ | P | P | P | P |
| 1250 | $X_{j,k}$ | $X_{j,k}$ | $X_{j,k}$ | $X_{j,k}$ | $X_{j,k}$ | P | P | P | P |
| 1500 | $X_{j,k}$ | $X_{j,k}$ | $X_{j,k}$ | $X_{j,k}$ | $X_{j,k}$ | P | P | P | P |
| 1750 | $X_{j,k}$ | $X_{j,k}$ | $X_{j,k}$ | $X_{j,k}$ | $X_{j,k}$ | P | P | P | P |
| 2000 | $X_{j,k}$ | $X_{j,k}$ | $X_{j,k}$ | $X_{j,k}$ | $X_{j,k}$ | P | P | P | P |
| 2250 | $X_{j,k}$ | $X_{j,k}$ | $X_{j,k}$ | $X_{j,k}$ | P | P | P | P | P |
| 2500 | $X_{j,k}$ | $X_{j,k}$ | $X_{j,k}$ | P | P | P | P | P | P |
| 2750 | $X_{j,k}$ | $X_{j,k}$ | P | P | P | P | P | P | P |
| 3000 | $X_{j,k}$ | P | P | P | P | P | P | P | P |
| 3250 | P | P | P | P | P | P | P | P | P |
| 3500 | P | P | P | P | P | P | P | P | P |
| 3750 | P | P | P | P | P | P | P | P | P |
| 4000 | P | P | P | P | P | P | P | P | P |
| 4250 | P | P | P | P | P | P | P | P | P |
| 4500 | P | P | P | P | P | P | P | P | P |
| 4750 | P | P | P | P | P | P | P | P | P |
| 5000 | P | P | P | P | P | P | P | P | P |

$X_{j,k}$ = Exempt Area,
  j = Throttle position
  k = Engine RPM
  P = Programmable area

FIGURE 4

FUEL MAP

Engine RPM

Throttle Position
(Percentage of full throttle)

| | 0 | 2 | 5 | 10 | 20 | 40 | 60 | 80 | 100 |
|---|---|---|---|---|---|---|---|---|---|
| 500 | X | X | X | X | X | P | P | P | P |
| 750 | X | X | X | X | X | P | P | P | P |
| 1000 | X | X | X | X | X | P | P | P | P |
| 1250 | X | X | X | X | X | P | P | P | P |
| 1500 | X | X | X | X | X | P | P | P | P |
| 1750 | X | X | X | X | X | P | P | P | P |
| 2000 | X | X | X | X | X | P | P | P | P |
| 2250 | X | X | X | X | X | P | P | P | P |
| 2500 | X | X | X | X | X | P | P | P | P |
| 2750 | X | X | X | X | X | P | P | P | P |
| 3000 | X | X | X | X | X | P | P | P | P |
| 3250 | P | P | P | P | P | P | P | P | P |
| 3500 | P | P | P | P | P | P | P | P | P |
| 3750 | P | P | P | P | P | P | P | P | P |
| 4000 | P | P | P | P | P | P | P | P | P |
| 4250 | P | P | P | P | P | P | P | P | P |
| 4500 | P | P | P | P | P | P | P | P | P |
| 4750 | P | P | P | P | P | P | P | P | P |
| 5000 | P | P | P | P | P | P | P | P | P |

X = Exempt Area
P = Programmable area

FIGURE 5

FUEL MAP

| Engine RPM | Throttle Position (percentage of full throttle) | | | | | | | | |
|---|---|---|---|---|---|---|---|---|---|
| | 0 | 2 | 5 | 10 | 20 | 40 | 60 | 80 | 100 |
| 500 | X | X | X | X | X | P | P | P | P |
| 750 | D | X | X | X | X | P | P | P | P |
| 1000 | D | X | X | X | X | P | P | P | P |
| 1250 | D | X | X | X | X | P | P | P | P |
| 1500 | D | X | X | X | X | P | P | P | P |
| 1750 | D | X | X | X | X | P | P | P | P |
| 2000 | D | X | X | X | X | P | P | P | P |
| 2250 | D | X | X | X | X | P | P | P | P |
| 2500 | D | X | X | X | X | P | P | P | P |
| 2750 | D | X | X | X | X | P | P | P | P |
| 3000 | D | X | X | X | X | P | P | P | P |
| 3250 | P | P | P | P | P | P | P | P | P |
| 3500 | P | P | P | P | P | P | P | P | P |
| 3750 | P | P | P | P | P | P | P | P | P |
| 4000 | P | P | P | P | P | P | P | P | P |
| 4250 | P | P | P | P | P | P | P | P | P |
| 4500 | P | P | P | P | P | P | P | P | P |
| 4750 | P | P | P | P | P | P | P | P | P |
| 5000 | P | P | P | P | P | P | P | P | P |

X = Exempt Area
D = Deceleration Exempt Area
P = Programmable area

FIGURE 6

FUEL INJECTION CONTROL SYSTEM WITH EXEMPT AREA OF FUEL MAP

FIELD OF INVENTION

The present invention relates to the field of fuel management systems for fuel-injected internal combustion engines.

BACKGROUND OF THE INVENTION

In a fuel-injected internal combustion engine, an electronic control unit (ECU) turns on the fuel injectors at the appropriate time to inject fuel into the cylinders. The percentage of time a fuel injector is open during the fuel cycle is known as the fuel injector duty cycle. Input data to the vehicle ECU, i.e., engine RPM, throttle position, crankshaft position and the like, are provided by factory installed engine sensors. The vehicle manufacturer provides stock ECU programming defining the fuel injector duty cycle for each value of throttle position and engine speed, which determines the fuel economy, power and emission levels for the vehicle.

Aftermarket fuel management systems that modify the performance of fuel-injected engines in cars and motorcycles are known. The Power Commander® fuel injection control module available from Dynojet Research Inc., North Las Vegas, Nev. 89081 is one such fuel management system.

The fuel management system is composed of a fuel management module and its associated software that enable the user to modify vehicle performance. A fuel management module is installed in-line between the vehicle ECU and the fuel injectors. The fuel management module affects engine performance by modifying the duty cycle of the fuel injectors by adding or subtracting from the fuel injector duty cycle. Specifically, the fuel management module contains a fuel map that defines how much the fuel injector duty cycle is to be increased or decreased for each value of throttle position and engine RPM. In particular, for each value of throttle position (expressed as a percentage of full throttle) and engine speed (in revolutions per minute, or RPM), the cells in the fuel map provide a corresponding fuel adjustment or "offset" to the stock programming provided by the vehicle manufacturer.

The manufacturer of the fuel management system typically provides one or more fuel maps that optimize a given performance criteria. For example, the user can choose one fuel map to optimize fuel economy or another fuel map to optimize towing capacity. Alternatively, the user can choose a fuel map that optimizes performance by maximizing acceleration or top speed. The user can also modify individual values of a fuel map to tune the vehicle. In such manner, the user is able to tune the performance of the vehicle.

SUMMARY OF THE INVENTION

Changing vehicle performance with a fuel management system may increase vehicle emissions. Some states, notably California, have air quality regulations that prohibit the sale or use of aftermarket fuel management devices that would result in increasing vehicle emissions beyond acceptable levels.

The present invention is embodied in a fuel management system whereby a user is able to modify vehicle performance without exceeding acceptable standards for vehicle emissions. In particular, a portion of the fuel management system fuel map is designated as an "exempt area". The user is not permitted to modify the fuel offset values in the exempt area of the fuel map.

One method for determining the exempt area of the fuel map is by examining the operation of the vehicle during standardized emissions testing. During a standardized emission test, the vehicle is driven on a prescribed course according to a prescribed driving profile. During the standardized emission test, the region of the fuel map actually traversed is observed (or predicted). The region of the fuel map traversed during the standard admission test becomes the exempt area of the fuel map in accordance with the present invention.

For example, assume that a given standardized emission test involved throttle positions less than 20%, and engine speeds less than 3000 RPM. Then, other areas of the fuel map, namely cells at higher engine speeds and higher throttle positions, while being of interest for high-performance, were not used during such given standardized emission test. Therefore, allowing the user to modify nonexempt areas of the fuel map (for example, at throttle positions greater than 20% and at engine speeds greater than 3000 RPM) still allows the vehicle to pass a standardized emissions test and not adversely affect air quality. Typically, standardized emissions tests represent the conditions in which most everyday driving occur. or during normal everyday driving Another method for determining the exempt area of the fuel map would be to empirically determine the area of the fuel map traversed during most everyday driving. Since the area of the fuel map traversed during most everyday driving is where most vehicle emissions will be generated, designating such area of the fuel map as the exempt area will have a greater impact in controlling emissions and maintaining air quality.

While the user is prohibited from modifying the fuel offset values in the exempt area of the fuel map, the manufacturer of the fuel management system may provide fuel injection offset values in the exempt area of the fuel map that provide improved vehicle performance yet will still permit the vehicle to pass applicable vehicle emission tests. In other words, the manufacturer of the fuel management system may choose to optimize performance in the region of the fuel map traversed during a standardized emissions test and then designate that same region as an exempt area thereby preventing or prohibiting the user from modifying the entries in such "exempt" area.

Alternatively, the manufacturer of the fuel management system may choose to preserve the original vehicle manufacturer's fuel programming. In the latter case, all of the offset values in the exempt area of the fuel map are set to zero.

Regardless of whether the fuel offset values set by the manufacturer of the fuel management system in the exempt area of the fuel map are zero or nonzero, the user is not permitted to modify fuel offset values in the exempt area of the fuel map. Thus, a fuel management system in accordance with the present invention permits the vehicle to pass the applicable emission test yet allows the user to modify vehicle performance in areas of the fuel map outside of the exempt area.

BRIEF DESCRIPTION OF THE DRAWINGS

FIG. 3 is a fuel map in accordance with the prior art.

FIG. 4 is a fuel map having an exempt area in accordance with the present invention.

FIG. 5 is an alternative embodiment of a fuel map having an exempt area in accordance with the present invention.

FIG. 6 is another alternative embodiment of a fuel map having an exempt area in accordance with the present invention.

DETAILED DESCRIPTION

Figure 1:
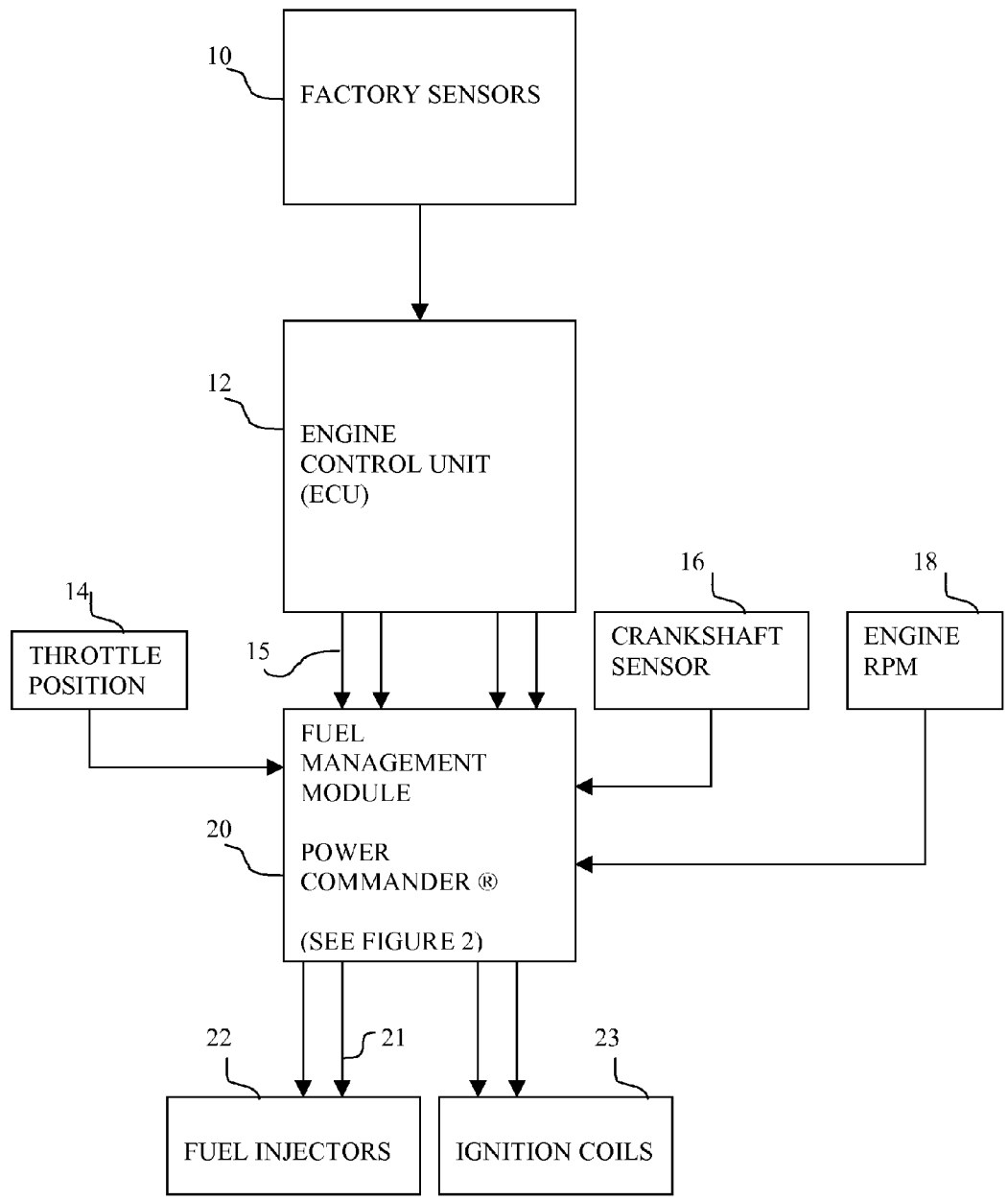
FIG. 1 is a partial block diagram of an internal combustion engine with a fuel management system in accordance with the present invention.

As shown in the block diagram of FIG. 1, a fuel-injected engine includes factory sensors 10, an engine control unit (ECU) 12, fuel injector drivers 22 and ignition coil drivers 23. A fuel management module 20 is positioned between the ECU 12 and the fuel injector drivers 22. In some models where the fuel management module alters engine timing, the fuel management module 20 is also positioned between the output of the ECU 12 and the ignition coil drivers 23.

Specifically, the fuel management module 20 is coupled to some of the engine sensors, namely the throttle position sensor 14, the engine RPM sensor 18 and crankshaft angle sensor 16. The ECU fuel injector control signals 15 are input to the fuel management module 20. The fuel management module 20 provides offset fuel injector control signals 21 to the fuel injectors 22. By positioning the fuel management module 20 between the ECU 12 and the fuel injectors 22 (and as well as the ignition coils 23), the fuel management module 20 modifies the operational characteristics of the engine.

Figure 2:
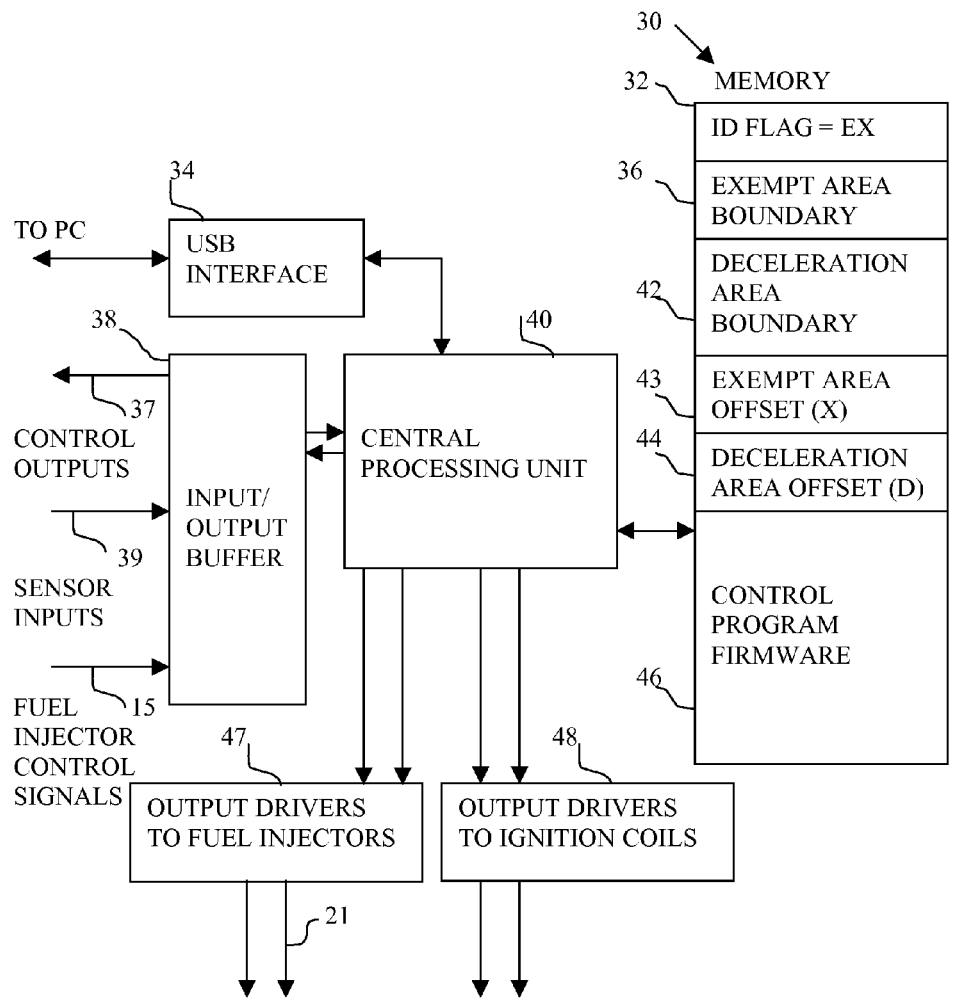
FIG. 2 is a block diagram of a fuel management module in accordance with the present invention.

The internal structure of the fuel management module 20 is shown in further detail in the block diagram of FIG. 2. The fuel management module 20 includes a programmed central processing unit 40 (CPU or central processor), an input/output buffer 38, a memory 30 (which may be a non-volatile flash memory), and output drivers 47 to the engine fuel injectors as well as output drivers 48 to the engine ignition coils.

The input/output buffer 38 receives factory sensor inputs 39 (e.g., throttle position, crankshaft angle sensor and engine RPM as shown in FIG. 1), ECU fuel injector control signals 15 (from ECU 12 in FIG. 1) and provides control outputs 37. A USB interface 34 provides communication to and from a personal computer (PC) for diagnostic displays and programming a fuel map stored in memory 30 of the fuel management module.

A prior art fuel map is shown in FIG. 3. The left vertical axis is engine speed in revolutions per minute (RPM). The top horizontal axis is throttle position expressed as a percentage of full throttle. Each of the cells of the fuel map contains a programmable data point. For example, the programmable cell $P_{3,6}$ representing 1750 RPM at 5% throttle can be set to zero, a positive number or a negative number. When set to zero, the fuel management module 20 neither adds nor subtracts from the duty cycle of the engine fuel injectors, i.e. no change. When programmable cell $P_{3,6}$ is set to a negative number, the fuel management module 20 reduces the duty cycle of the engine fuel injectors, resulting in less fuel being provided to the engine cylinders. When programmable cell $P_{3,6}$ is set to a positive number, the fuel management module 20 increases the duty cycle of the engine fuel injectors, resulting in more fuel being provided to the engine cylinders.

In between cells of the fuel map, offset values are determined by interpolation. For example, for values of engine speed between 1500 and 1750 RPM at 5% throttle position, the offset value is determined by linear interpretation between the value in the programmable cell $P_{3,5}$ and the value in the programmable cell $P_{3,6}$. Similarly, for values of throttle position between 2% and 5% at 1750 RPM, the offset value is determined by linear interpretation between the value in the programmable cell $P_{2,6}$ and the value in the programmable cell $P_{3,6}$. At the endpoints of the RPM scale, no further interpolation is necessary. That is, the value in programmable cell $P_{1,1}$ is used for all values of engine speed between 0 and 500 RPM. Similarly, the value in programmable cell $P_{1,19}$ is used for all values of engine speed above 5000 RPM. Thus, to alter the engine performance characteristics, the fuel management module 20 of FIG. 1 receives a plurality of ECU fuel injector control signals 15 from ECU 12, modifies those signals in accordance with a stored fuel map in order to generate a plurality of offset fuel injector control signals 21 to the engine fuel injectors 22.

In the prior art fuel map of FIG. 3, all of the cells (500-5000 rpm and 0-100% full throttle) are programmable by the user. Thereby, the performance of the engine over its entire operating range may be modified according to the desires of the user. However, as previously indicated, the user may modify the fuel map of the fuel management module in such manner so that the vehicle no longer complies with government mandated vehicle emissions standards.

A fuel map in accordance with the present invention is shown in FIG. 4. The cells of the fuel map designated $X_{j,k}$ (where j equals throttle position and k equals engine RPM) define an exempt area of the fuel map. That is, for each of the cells designated with $X_{j,k}$ the user is not permitted to view or modify the offset values. However, the manufacturer of the fuel management system may designate the offset values in the exempt area of the fuel map. The fuel management system PC software is designed to prohibit the user from viewing or modifying the offset values in any of the cells in the exempt area of the fuel map. The fuel management module firmware is designed not to allow the user to reprogram the fuel management module. However, in the nonexempt areas of the fuel map, the user can both view and modify the offset values so as to enhance the performance of the vehicle.

The fuel map of FIG. 4 represents a generalized case in which the exempt area can be composed of any number of adjacent or nonadjacent cells. A special case, in which the exempt area is rectangle positioned at the origin (0, 0), is shown in FIG. 5. In general, less memory is required to define a rectangular area as compared to non-rectangular area. In particular, the exempt area in FIG. 5 is defined by two parameters, namely a maximum speed (3000 RPM) and a maximum throttle position (20%). The manufacturer of the fuel management system may provide a single offset value for all the cells in the exempt area of FIG. 5, which the user may not change.

The fuel map of FIG. 6 represents a further refinement of the special case in which the exempt area is rectangular. In FIG. 6, a deceleration exempt area from 750-3000 RPM at 0% throttle is defined. The deceleration exempt area corresponds to a condition where the throttle is completely released at 3000 RPM or less, i.e. where the vehicle is slowing down.

Typically, most stock manufacturer's fuel programs completely cut fuel in this region. Since it is desirable to have some ready power in reserve when coming off of a deceleration, the manufacturer of the fuel management system may provide a positive fuel offset in the deceleration exempt area. The remainder of the exempt area (designated by X's) will have a different fuel offset value.

Returning to FIG. 2, the memory 30 stores values to implement the fuel map of FIG. 6. In particular, memory 30 includes a flag 32 that identifies the fuel management module as an exempt (EX) unit, as compared to a regular unit. In addition, memory 30 includes the definition of the exempt area boundary 36 in the form of a maximum RPM and a maximum throttle position (in this case 3000 RPM and 20% throttle position). Memory 30 also includes the definition 42 of a deceleration exempt area (e.g., 750-3000 RPM at 0% throttle) within the larger exempt area 36 boundary. A value corresponding to a fuel offset value 43 in the exempt area (e.g., for cells marked with X's in FIG. 6) is stored in memory 30. Similarly, a value corresponding to a fuel offset value 44 in the deceleration exempt area (e.g., for cells marked with D's in FIG. 6) is stored in memory 30. It is understood that while a single memory 30 is shown, the ID flag 32, the exempt area 36, the deceleration area 42, the exempt area fuel offset 43, the fuel offset value 44 in the deceleration area and the control program firmware 46, may alternatively be stored in two or more separate memories.

A fuel map with a rectangular exempt area centered at the origin is convenient for two reasons. First, there is economy of memory storage, because only two parameters (maximum RPM and maximum throttle) need be stored in order to define the exempt area. Second, monitoring (or predicting) the exempt area of the fuel map traversed during emissions testing is facilitated because one need only predict (or observe) the maximum engine speed RPM and maximum throttle position encountered during the vehicle emissions testing profile.

Figure 7:
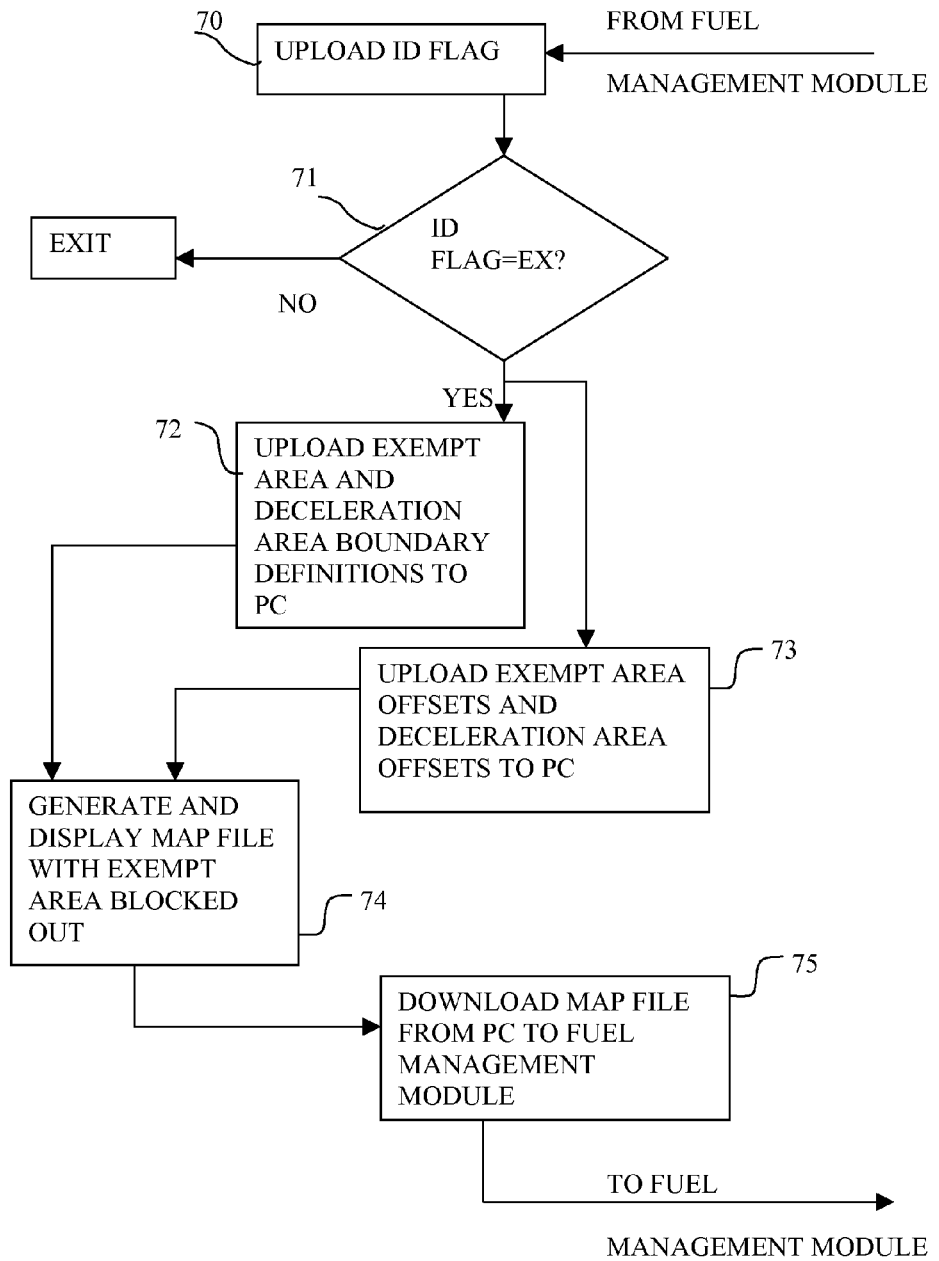
FIG. 7 is a flow chart diagram of a portion of the specialized PC software for preventing modifications to an exempt area of a fuel map in accordance with the present invention.
Figure 8:
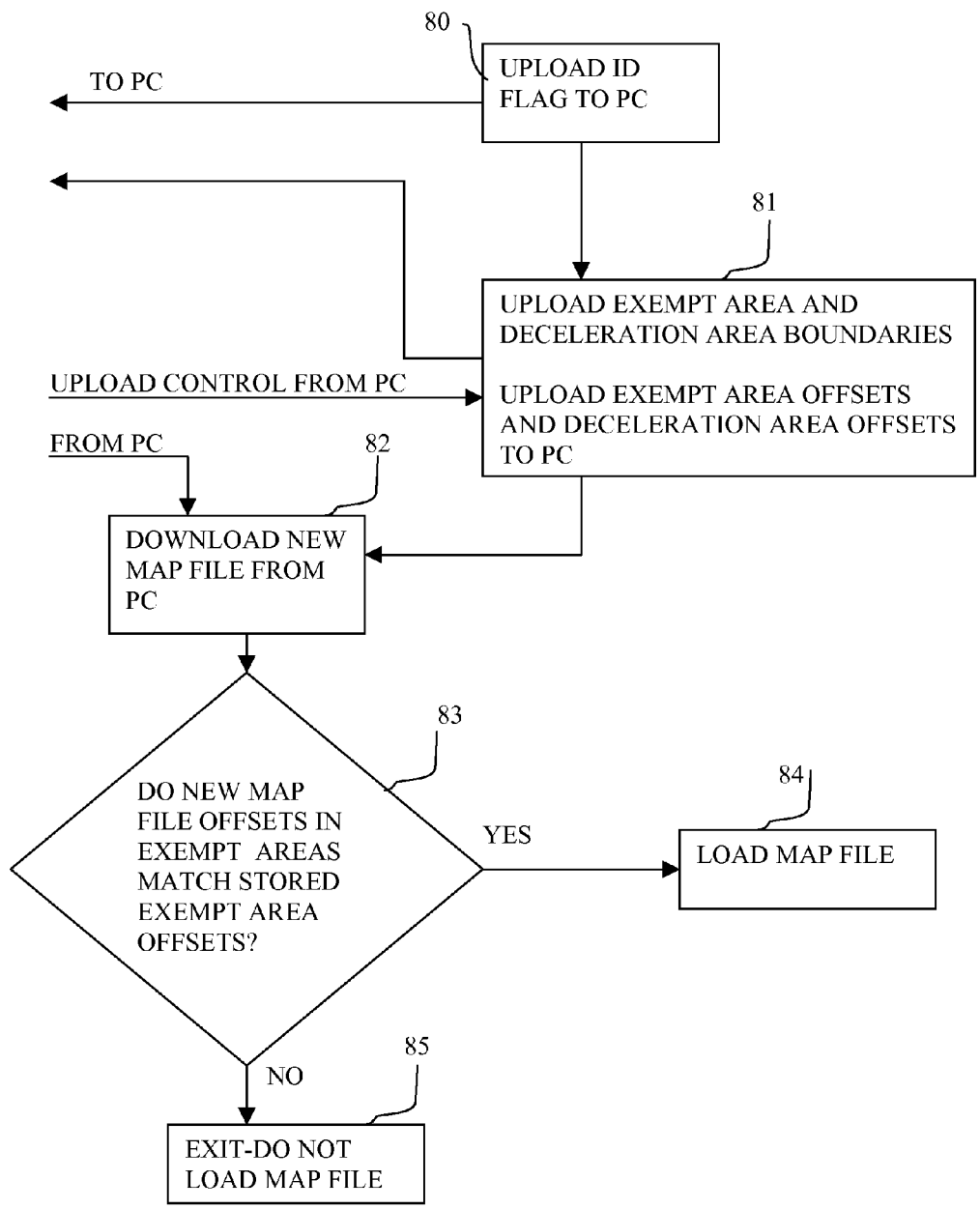
FIG. 8 is a flow chart diagram of a portion of the control program firmware for preventing modifications to an exempt area of a fuel map in accordance with an alternate embodiment of the present invention.

The fuel management module of FIG. 2 is coupled via a USB interface 34 to a PC running specialized PC software. The primary function of the specialized PC software is to program the fuel management module 20 by adjusting the offset values in the fuel map. FIGS. 7 and 8 indicate alternative embodiments by which the user is prevented from modifying fuel offset values in the exempt area of the fuel map.

FIG. 7 is a flow chart diagram of a portion of the specialized PC software. The specialized PC software uploads the ID FLAG (from the fuel management module in FIG. 2) at step 70. The specialized PC software decides whether the fuel management module is a regular unit or an exempt (EX) unit at step 71. If the ID FLAG is not equal to EX at step 71, the program exits. If ID FLAG=EX, the exempt area and deceleration area boundaries are uploaded to the PC at step 72. Additionally, the fuel offsets in the exempt area and the deceleration exempt area are uploaded to the PC at step 73. The PC then generates a map file display with the exempt area blocked out at step 74.

The exempt area is displayed to the user on the PC monitor in a different color than the rest of the fuel map. The displayed exempt area is also blank, i.e. displayed with no values in each of the cells within the exempt area. The user may modify the fuel offset values in any of the areas of the fuel map except for the exempt area which includes the deceleration exempt area. After modification, the specialized PC software generates a corresponding fuel map file (with the file extension .djm) that is downloaded to the fuel management module at step 75. A newly generated map file would define new map file with modified fuel offset values to replace the stored map file in memory. However, the specialized PC software prevents the user from generating a map file containing modified fuel offset values in said exempt area of said fuel map.

Therefore, if the unit is an exempt (ID FLAG=EX) unit, the specialized PC software will not allow the user to modify any of the offset values in the exempt area including the deceleration area. In other words, for units with an ID FLAG equal to EX, the user is prohibited from modifying any of the offset values in the exempt area of the fuel map.

Normally, the specialized PC software contains a feature for reprogramming the fuel management module with the latest firmware changes. The reprogramming feature is disabled for exempt (EX) units to prevent users from reprogramming an EX fuel management module as a regular fuel management module. The firmware lockout is achieved by disabling the boot program so that the memory (30 in FIG. 2) may not be reprogrammed through the USB interface (34 in FIG. 2). By locking out updates to the control program firmware 46 and the identification flag 32, the user is not able to program the fuel offset values in the exempt area by changing the control program firmware to a regular (not exempt) program. However, the manufacturer of the fuel management module may still reprogram memory 30 via an internal connector that is not normally accessible to the user. Control program firmware is control program software in non-volatile, reprogrammable storage.

FIG. 8 is a flow chart diagram of a portion of the control program firmware that represents an alternative method for preventing the user for making modifications to the exempt area of a fuel map. As previously described (in conjunction with FIG. 7), the fuel management module uploads its ID FLAG to the PC at step 80. The upload control from the PC initiates a transfer at step 81 to upload the exempt area (including the deceleration exempt area) boundaries and the corresponding fuel offsets for each area.

The user may then use the specialized PC software to modify the fuel map. After modification, the specialized PC software will generate a new map file (with a *djm file extension). The new map file is downloaded from the PC at step 82. In step 83, the control program firmware compares the fuel offset values in the exempt area of the new downloaded map file to the corresponding values stored in memory (reference 30 of FIG. 2).

If the new downloaded map file contains fuel offset values in the exempt area that match the corresponding stored fuel offset values in the fuel management module memory, then the control program firmware accepts and uses the new downloaded map file at step 84. However, if the new downloaded map file contains fuel offset values in the exempt area that do not match the corresponding stored fuel offset values in the fuel management module memory, then the control program firmware rejects the new downloaded map file and exits at step 85.

As used herein, an exempt area of the fuel map is a region of the fuel map where the manufacturer of the fuel management system can store fuel offset values, but a user of the fuel management system is prevented from modifying the fuel offset values set by the manufacturer in such exempt area. The exempt area of the fuel map may represent a region corresponding primarily to everyday driving conditions. The exempt area of the fuel map may represent a region corresponding to a given air quality emission test profile.

It should be understood that although the fuel map representation in the preferred embodiment stores offsets (increments or decrements) to the stock fuel duty cycle, it is possible to store absolute values of fuel duty cycle or other representations of fuel injection parameters that control engine performance. As used herein, the term "fuel offset values" means any representation of fuel injection parameters in a fuel map that control engine performance.

Since the offset values set by the manufacturer of the fuel management system in the exempt area of the fuel map originally permitted the vehicle to meet air quality emission standards, and the user is not able to modify those values, then the vehicle will continue to meet air quality emission standards, yet the user will be able to modify the non-exempt areas of the fuel map to enhance performance of the vehicle. Thus, a fuel management system in accordance with the present invention allows a user to enhance vehicle performance while at the same time meet air quality emission standards.

What is claimed is:

1. A fuel management module for use with an internal combustion engine having a plurality of fuel injectors, said internal combustion engine further having an electronic control unit (ECU) providing ECU fuel injector control signals, said fuel management module being coupled to said electronic control unit for receiving said ECU fuel injector control signals, said fuel management module providing a plurality of offset fuel injector control signals coupled to respective ones of said plurality of fuel injectors, said fuel management module comprising:
   a memory for storing a fuel map defining a plurality of fuel offset values for a respective plurality of predetermined values of engine speed and throttle position;
   said memory further storing a definition of an exempt area within said fuel map;
   a programmed central processor for computing said plurality of offset fuel injector control signals in accordance with said fuel offset values stored in said fuel map; and
   means for prohibiting a user of said fuel management module from modifying said fuel offset values in said exempt area of said fuel map.

2. A system arrangement in combination with claim 1, further including a PC coupled to said fuel management module to generate a map file defining modified fuel offset values to be stored in said fuel map of said fuel management module, said PC programmed with specialized PC software, wherein said means for prohibiting a user of said fuel management module from modifying said fuel offset values in said exempt area of said fuel map comprises said specialized PC software being programmed to prevent said user from generating a map file defining modified fuel offset values in said exempt area of said fuel map.

3. An apparatus in accordance with claim 1, wherein said means for prohibiting a user of said fuel management module from modifying said fuel offset values in said exempt area of said fuel map comprises control program software stored in said memory, wherein said control program software prevents said user from modifying said fuel offset values in said exempt area of said fuel map.

4. An apparatus in accordance with claim 1, wherein said exempt area within said fuel map is defined as a rectangular area.

5. An apparatus in accordance with claim 1, wherein said exempt area within said fuel map is a rectangular area defined by a maximum throttle position and a maximum engine RPM.

6. An apparatus in accordance with claim 1, wherein said fuel map contains a plurality of cells, each cell containing a respective fuel offset value, and each cell within said exempt area of said fuel map containing a first fuel offset value.

7. An apparatus in accordance with claim 1, wherein said definition of an exempt area within said fuel map further includes a definition of a deceleration area within said exempt area, said fuel map contains a plurality of cells, each cell other than said deceleration area containing a first fuel offset value, and each cell within said deceleration area of said fuel map containing a second fuel offset value.

8. In a fuel management module for use with an internal combustion engine having a plurality of fuel injectors, said internal combustion engine further having an electronic control unit (ECU) providing ECU fuel injector control signals, said fuel management module being coupled to said electronic control unit for receiving said ECU fuel injector control signals, said fuel management module providing a plurality of offset fuel injector control signals coupled to respective ones of said plurality of fuel injectors, said fuel management module further having a memory for storing a fuel map defining a plurality of fuel offset values for a respective plurality of predetermined values of engine speed and throttle position, a method comprising:
   storing a fuel map in said memory containing a plurality of fuel offset values;
   storing in said memory a definition of an exempt area within said fuel map; and
   prohibiting a user of said fuel management module from modifying said fuel offset values in said exempt area of said fuel map.

9. A method in accordance with claim 8, for use in a fuel management system further including a PC coupled to said fuel management module to generate a map file defining modified fuel offset values to be stored in said fuel map of said fuel management module, said PC programmed with specialized PC software, wherein said step of prohibiting said user of said fuel management module from modifying said fuel offset values in said exempt area of said fuel map comprises:
   using said specialized PC software to prevent said user from generating a map file defining modified fuel offset values in said exempt area of said fuel map.

10. A method in accordance with claim 8, for use in a fuel management module further including control program software stored in said memory, wherein said step of prohibiting said user of said fuel management module from modifying said fuel offset values in said exempt area of said fuel map comprises using said control program software to prevent said user from modifying said fuel offset values in said exempt area of said fuel map.

11. A method in accordance with claim 8, further comprising defining said exempt area within said fuel map as a rectangular area.

12. A method in accordance with claim 8, further comprising defining said exempt area within said fuel map by a maximum throttle position and a maximum engine RPM.

13. A method in accordance with claim 8, wherein said fuel map contains a plurality of cells, each cell containing a respective fuel offset value, said method further comprising storing a first fuel offset value in each cell of said exempt area of said fuel map.

14. A method in accordance with claim 8, wherein said fuel map contains a plurality of cells, each cell containing a respective fuel offset value, wherein said definition of an exempt area within said fuel map further includes a definition of a deceleration area within said exempt area, said method further comprising:
   storing a first fuel offset value in each cell of said exempt area of said fuel map other than said deceleration area; and
   storing a second fuel offset value in each cell of said deceleration area of said fuel map.

15. In a fuel management module for use with an internal combustion engine having a plurality of fuel injectors, said internal combustion engine further having an electronic control unit (ECU) providing ECU fuel injector control signals, said fuel management module being coupled to said electronic control unit for receiving said ECU fuel injector control signals, said fuel management module providing a plurality of offset fuel injector control signals coupled to respective ones of said plurality of fuel injectors, said fuel management module further having a memory for storing a fuel map defining a plurality of fuel offset values for a respective plurality of predetermined values of engine speed and throttle position, an improvement comprising:

a fuel map stored in said memory, said fuel map containing a plurality of fuel offset values;

a definition of an exempt area of said fuel map stored in said memory; and a means for prohibiting a user of said fuel management module from modifying said fuel offset values in said exempt area of said fuel map.

16. A system arrangement in combination with claim 15, further including a PC coupled to said fuel management module to generate a map file defining modified fuel offset values to be stored in said fuel map of said fuel management module, said PC programmed with specialized PC software, wherein said means for prohibiting a user of said fuel management module from modifying said fuel offset values in said exempt area of said fuel map comprises said specialized PC software being programmed to prevent said user from generating a map file defining modified fuel offset values in said exempt area of said fuel map.

17. An apparatus in accordance with claim 15, wherein said means for prohibiting a user of said fuel management module from modifying said fuel offset values in said exempt area of said fuel map comprises control program software stored in said memory, wherein said control program software prevents said user from modifying said fuel offset values in said exempt area of said fuel map.

18. An apparatus in accordance with claim 15, wherein said exempt area within said fuel map is defined as a rectangular area.

19. An apparatus in accordance with claim 15, wherein said exempt area within said fuel map is a rectangular area defined by a maximum throttle position and a maximum engine RPM.

20. An apparatus in accordance with claim 15, wherein said fuel map contains a plurality of cells, each cell containing a respective fuel offset value, and each cell within said exempt area of said fuel map containing a first fuel offset value.

21. An apparatus in accordance with claim 15, wherein said definition of an exempt area within said fuel map further includes a definition of a deceleration area within said exempt area, said fuel map contains a plurality of cells, each cell other than said deceleration area containing a first fuel offset value, and each cell within said deceleration area of said fuel map containing a second fuel offset value.

* * * * *